R. T. GULLIFORD.
VARIABLE THROW MECHANISM FOR AUTOMATIC MACHINES.
APPLICATION FILED APR. 16, 1910.

1,025,976.

Patented May 14, 1912.

2 SHEETS—SHEET 1.

ATTEST
C. M. Fisher
J. P. Mussun

INVENTOR.
Roy T. Gulliford.
By Fisher & Moser
ATTYS.

R. T. GULLIFORD.
VARIABLE THROW MECHANISM FOR AUTOMATIC MACHINES.
APPLICATION FILED APR. 16, 1910.
1,025,976.
Patented May 14, 1912.
2 SHEETS—SHEET 2.
Fig. 3.
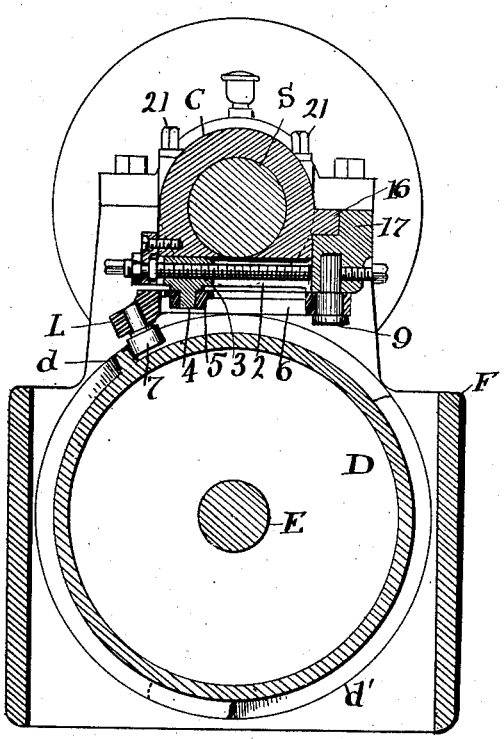
Fig. 4.
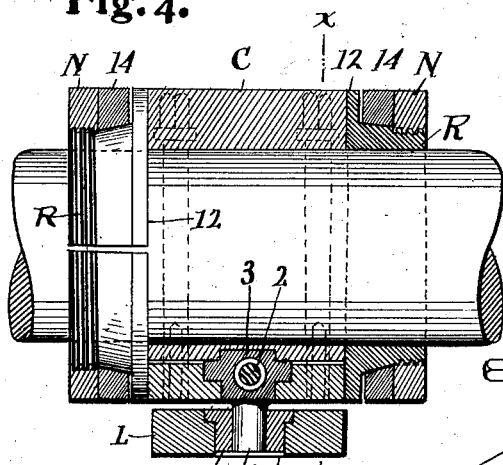
Fig. 5.
ATTEST
E. M. Fisher
J. P. Mussun
INVENTOR
Roy T. Gulliford.
BY Fisher & Mosit ATTYS.

UNITED STATES PATENT OFFICE.

ROY T. GULLIFORD, OF WEST NOTTINGHAM, OHIO.

VARIABLE-THROW MECHANISM FOR AUTOMATIC MACHINES.

1,025,976. Specification of Letters Patent. Patented May 14, 1912.

Application filed April 16, 1910. Serial No. 555,970.

*To all whom it may concern:*

Be it known that I, ROY T. GULLIFORD, citizen of the United States, residing at West Nottingham, in the county of Cuyahoga and State of Ohio, have invented certain new and useful Improvements in Variable-Throw Mechanism for Automatic Machines, of which the following is a specification.

My invention relates to variable throw mechanism for automatic machines, all substantially as shown and described and particularly pointed out in the claims.

Figure 1:
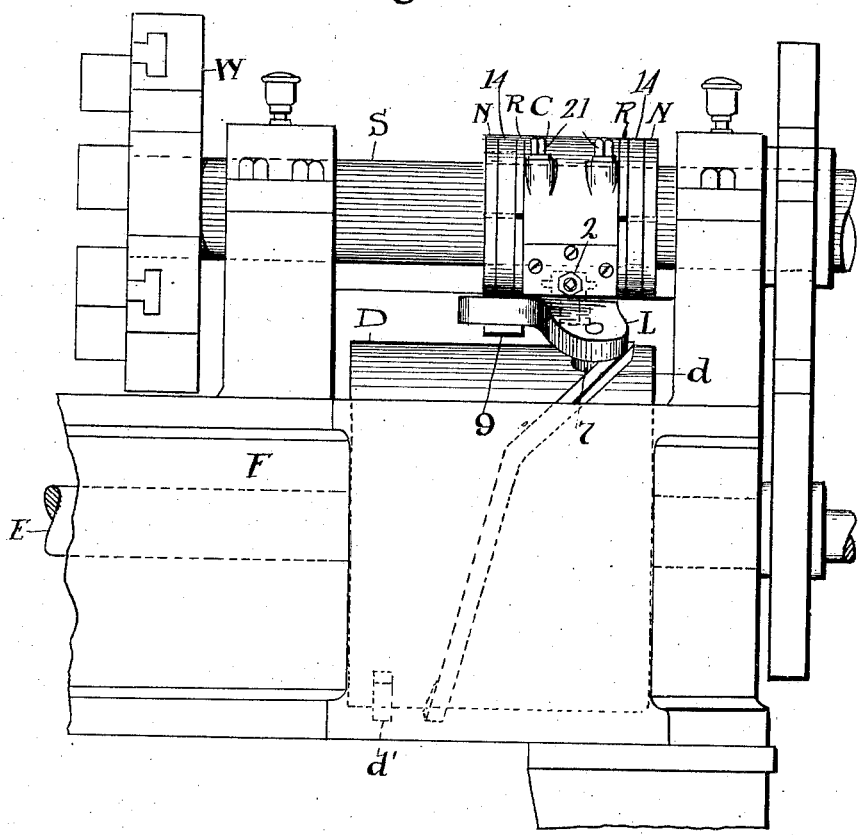
Figure 2:
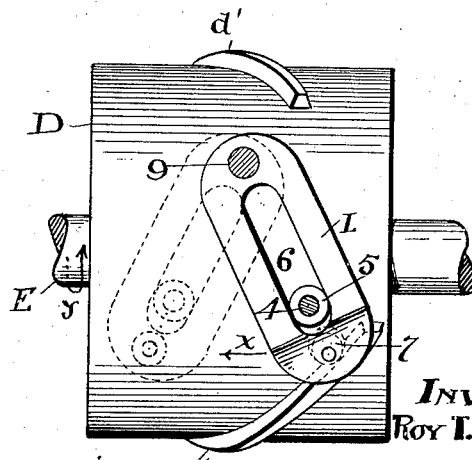

In the accompanying drawings, Figure 1 is a side elevation of a machine embodying my invention. Fig. 2 is an enlarged elevation of a portion of the cam drum and a lever adapted to produce the variable movements for which the invention is intended. Fig. 3 is a cross section of the said drum and lever and other parts shown in Fig. 2 and taken on the line of the screw which governs the position of the parts. Fig. 4 is a sectional view of the collar on the axis of the spindle, and Fig. 5 is a cross section of the collar and spindle on line $x$—$x$, Fig. 4.

The idea of employing an operating spindle or shaft with a workholder upon one end thereof to be moved or reciprocated axially toward and from the tool or tools adapted to engage the work is not claimed to be new at this time and machines embodying this idea in one form or another are well known, especially such as make change of working position by interchange of drums having cams adapted to produce or afford different ranges or throw of the spindle according to the cam range on the particular drum used.

According to my invention the same result is obtained by means of a single drum permanently mounted in the machine and certain novel parts interposed between the drum and the work holding spindle and adapted by a simple and easy movement to control the working of the toolholder in relation to the tool or tools, not shown herein.

Now, referring to the drawings, S represents a spindle or shaft having a work holder W mounted on its end and the said spindle itself is supported in suitable bearings in the machine in which it has limited axial movement or reciprocation as the work requires.

D represents the cam drum mounted on a shaft E and adapted to be rotated by any suitable means at a predetermined speed and carrying a cam rib or ribs or their equivalent, such as a cam groove or channel or the like, and so disposed on the drum as to produce the desired effect upon the spindle S through lever L and the parts associated therewith. In the present case the drum carries two detached or separate cams or cam ribs $d$ and $d'$ disposed relatively and shaped respectively as seen chiefly in Fig. 2. The rib $d$ at its initial portion is constructed with such an angle to the direction of rotation or to shaft E as to cause an especially quick action while the other part is much less inclined, and the distance of its throw of lever L is shown as from full lines to dotted lines, Fig. 2. The arrows $x$ and $y$ show the direction of travel. Now, having the lever L moved to position as in dotted lines, Fig. 2, it comes within the path of cam $d'$ to be engaged by the initial end of said cam relatively as seen in Fig. 1 where cam $d'$ is shown as overlapping the extremity of cam $d$. As this occurs the said cam or rib strikes the roller 7 on the bottom and end of lever L, and in its travel carries the lever back to starting position relatively as seen in full lines Fig. 2, and in the path of said rib or cam $d$. The said lever L is provided with a longitudinal slot 6 and is pivoted at its inner end by pivot pin 9 on the main frame between drum D and collar C on spindle or shaft S. The said collar is mounted or sleeved upon shaft S but otherwise is independent thereof and is fixed in respect to the body or frame F of the machine between split rings R at its sides which, in this instance, are clamped upon spindle S by clamping nuts N of ring shape. The surface of ring R is outwardly inclined between its inner flange 12 and its thread, and a ring 14 with a like inner inclined surface is adapted to said inclined portion and assists in compressing locking ring R on the shaft when nut N is tightened. These or any other suitable means for fixing rings R in working position may be adopted.

The axial stroke or throw of spindle or shaft S is adapted to be varied within the limits of slot 6, in lever L and the maximum movement brings slide or roller 5 into the outer end of said slot while the minimum movement brings the said part 5 into the inner end of said slot. The position of said slide may be anywhere between these extremes and is governed by nut 3 in collar C which has a stem 4 depending therefrom on which slide or roller 5 is loosely mounted. The said nut is shaped as seen in Fig. 4 and adapted to slide transversely in a correspondingly shaped groove or channel at the bottom of collar C and has a threaded hole through which adjusting screw 2 engages. Said screw is adapted to be turned but has no axial movement and it carries nut 3 across in said channel according to the throw wanted for shaft or spindle S. Obviously with said slide 5 at the inner end of slot 6 the movement of shaft or spindle S will be at the minimum even though lever L has its accustomed movement by the respective cams $d$ and $d'$, and collar C communicates the throw, whether it be more or less, to spindle S. To this end said collar is movable axially with the spindle but is locked against rotation by its flange 16 and shoulder 17 bearing against the main frame F, or by any equivalent means.

Now, referring to Figs. 4 and 5, it will be noticed also that the guide way and support for nut 3 beneath the flattened bottom surface of collar C is formed in two parallel side pieces, rabbeted on corresponding inner edges to support the side wings of the nut thereon and secured at their ends to the collar by through bolts 21. Dowel pins or plugs 24 may also be used. When the nut 3 has been adjusted to any desired position it is locked by tightening said screws 21, and said screws are loosened when adjustment is to be made. This provides for take up in lost motion occasioned by wear and strain upon the nut.

In some types of machine, a reciprocable shaft or carriage is used to operate the tool holders instead of the work holders, and obviously my improved device is as applicable to one as to the other, and the claims are so to be construed.

What I claim is:

1. A reciprocable spindle and a cam drum in parallel relation side by side, in combination with a collar on said spindle and a transversely adjustable nut next beneath the same and supported therefrom and having a stem, and a slotted lever into which said stem extends provided with a projection on its under side engaging said cam drum.

2. In a machine as described, a reciprocable spindle, a collar sleeved on said spindle, means to fix said collar in different set positions longitudinally of said spindle, a nut carried by said collar having a stem, means to adjust said nut transversely beneath said collar, a slotted lever engaging said stem and pivotally mounted to oscillate transversely beneath the spindle and its collar, and a cam drum to operate said lever and therethrough the spindle.

3. In a machine substantially as described, a reciprocable spindle and means to impart a longitudinal movement thereto comprising a lever, a collar fixed on said spindle and a nut and a screw to provide a variable throw for said spindle having operating connection with said collar and clamping means adapted to fix said nut in any adjusted position thereon, in combination with a rotatable drum having a cam groove and a roller on the bottom of said lever engaged in said cam groove.

4. In a machine substantially as described, a reciprocable spindle and means to impart a longitudinal movement thereto comprising a lever, a collar fixed on said spindle and a nut and a screw therewith adapted to provide a variable throw for said spindle and clamping means adapted to fix said nut in any adjusted position thereon comprising bolts through said collar, in combination with a cam drum parallel to said spindle and having a channel in which said lever is operatively engaged.

5. In a machine substantially as described, a reciprocable spindle having a collar thereon and a screw mounted transversely thereon, a transversely adjustable nut adapted to travel on said screw and having a stem and a roller on the stem, clamping plates and bolts adapted to lock said nut upon said collar when adjusted, a lever for operating said spindle having a slot in which said roller is operatively engaged and a cam drum operatively engaging the free end of said lever.

In testimony whereof I affix my signature in presence of two witnesses.

ROY T. GULLIFORD.

Witnesses:
 E. M. FISHER,
 F. C. MUSSUN.

---

Copies of this patent may be obtained for five cents each, by addressing the "Commissioner of Patents, Washington, D. C."